(12) United States Patent
Frodsham et al.

(10) Patent No.: US 7,617,424 B2
(45) Date of Patent: Nov. 10, 2009

(54) ERROR MONITORING FOR SERIAL LINKS

(75) Inventors: Timothy Frodsham, Portland, OR (US);
Zale T. Schoenborn, Portland, OR (US);
Sanjay Dabral, Pala Alto, CA (US);
Muraleendhara Navada, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 402 days.

(21) Appl. No.: 11/323,111

(22) Filed: Dec. 30, 2005

(65) Prior Publication Data

US 2007/0157054 A1      Jul. 5, 2007

(51) Int. Cl.
*G06F 11/00* (2006.01)
(52) U.S. Cl. .................................................. 714/704
(58) Field of Classification Search .................. 714/704, 714/706, 797, 799, 812, 705; 377/49, 94, 377/26, 44, 55
See application file for complete search history.

(56) References Cited

U.S. PATENT DOCUMENTS

| | | | | |
|---|---|---|---|---|
| 5,036,515 A | * | 7/1991 | Freeburg | 714/708 |
| 5,142,651 A | * | 8/1992 | Cronyn | 377/44 |
| 5,146,324 A | * | 9/1992 | Miller et al. | 375/240.03 |
| 5,301,219 A | * | 4/1994 | Cronyn | 377/44 |
| 5,317,706 A | * | 5/1994 | Pechter | 711/2 |
| 5,497,406 A | * | 3/1996 | de Lima et al. | 377/44 |
| 5,581,163 A | * | 12/1996 | Alves de Lima et al. | 315/371 |
| 6,973,602 B1 | * | 12/2005 | Fung et al. | 714/704 |
| 7,032,139 B1 | * | 4/2006 | Iryami et al. | 714/704 |
| 7,062,687 B1 | * | 6/2006 | Gfeller et al. | 714/704 |
| 7,231,558 B2 | * | 6/2007 | Gentieu et al. | 714/704 |
| 7,246,274 B2 | * | 7/2007 | Kizer et al. | 714/704 |
| 7,386,767 B1 | * | 6/2008 | Xue et al. | 714/704 |

* cited by examiner

*Primary Examiner*—Phung M Chung
(74) *Attorney, Agent, or Firm*—Blakely, Sokoloff, Taylor & Zafman LLP

(57) ABSTRACT

Methods, apparatuses and systems for physical link error data capture and analysis.

10 Claims, 6 Drawing Sheets

ERROR MONITORING FOR SERIAL LINKS

TECHNICAL FIELD

Embodiments of the invention relate to a physical layer interface of a computing system. More particularly, embodiments of the invention relate to error monitoring for serial links between components of a computing system.

BACKGROUND

In computing systems, as operating frequencies increase external testing of physical links becomes increasingly difficult. Some physical link specifications incorporate self-test hooks that can be used to collect, for example, eye diagrams, equivalent time oscilloscope traces and/or bit error rate diagrams. However, these self-test hooks may be sufficiently inflexible, which may result in a complex and/or time consuming testing and debugging process.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

In one embodiment, pattern generation and comparison may be utilized for error checking purposes. As described in greater detail below, flexibility in the error checking functionality may be provided to enable targeted, hardware specific testing and generic tools such as an "on-die oscilloscope." Programmable offsets and intervals in the error checking mechanism may allow support of targeted tests and on-die oscilloscope functionality.

In order to adequately characterize error rates on a high-speed serial link, measurements may be taken over a range of frequencies, timing and/or voltage stress factors. At the high end of frequency and stress, large counters may be required to measure the expected error rate. At the low end of frequency and stress, smaller counters may be used because the error rate may be lower. However, simply utilizing large counters to support a full range of testing may be relatively expensive in terms of circuit size and/or power consumption.

As described in greater detail below, in one embodiment, individual counters may be used for individual data lanes. Multiple individual counters may be multiplexed to provide an extended counter for a selected data lane. This extended error counting functionality may allow flexibility to characterize high bit error rates for a selected data lane.

Figure 1:
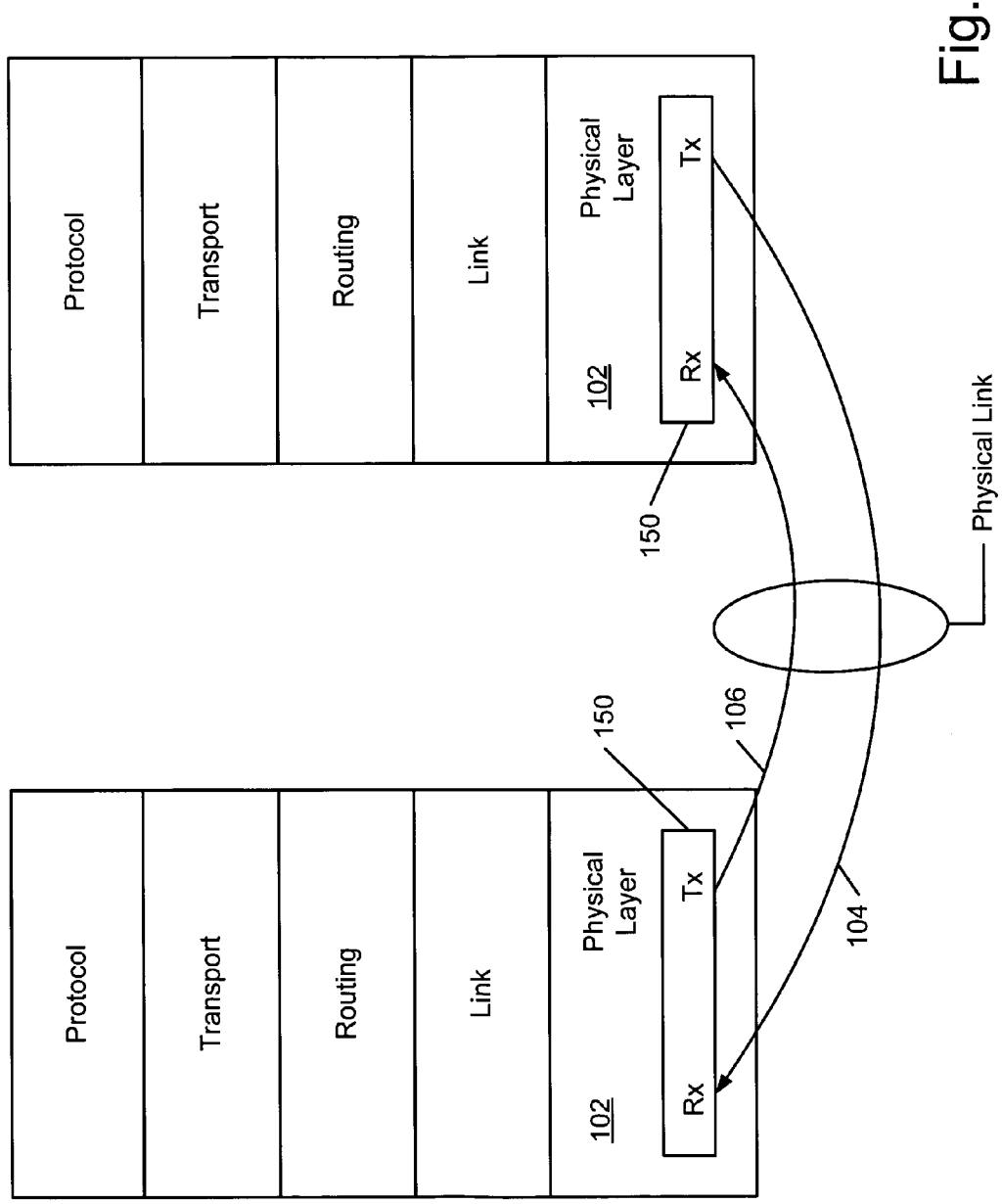
FIG. 1 is a block diagram of one embodiment of an apparatus for a physical interconnect.

FIG. 1 is a block diagram of one embodiment of an apparatus for a physical interconnect. In one aspect, the apparatus depicts a physical layer for a cache-coherent, link-based interconnect scheme for a processor, chipset, and/or I/O bridge components. For example, the physical interconnect may be performed by each physical layer of an integrated device. The physical interconnect may support training and testing in association with use of an oscilloscope probe or other test equipment to monitor the physical interconnect.

Specifically, the physical layer may provide communication between two ports over a physical interconnect comprising two uni-directional links. Specifically, one unidirectional link 104 from a first transmit port 150 of a first integrated device to a first receiver port 150 of a second integrated device. Likewise, a second uni-directional link 106 from a first transmit port 150 of the second integrated device to a first receiver port 150 of the first integrated device. However, the claimed subject matter is not limited to two uni-directional links.

Figure 2:
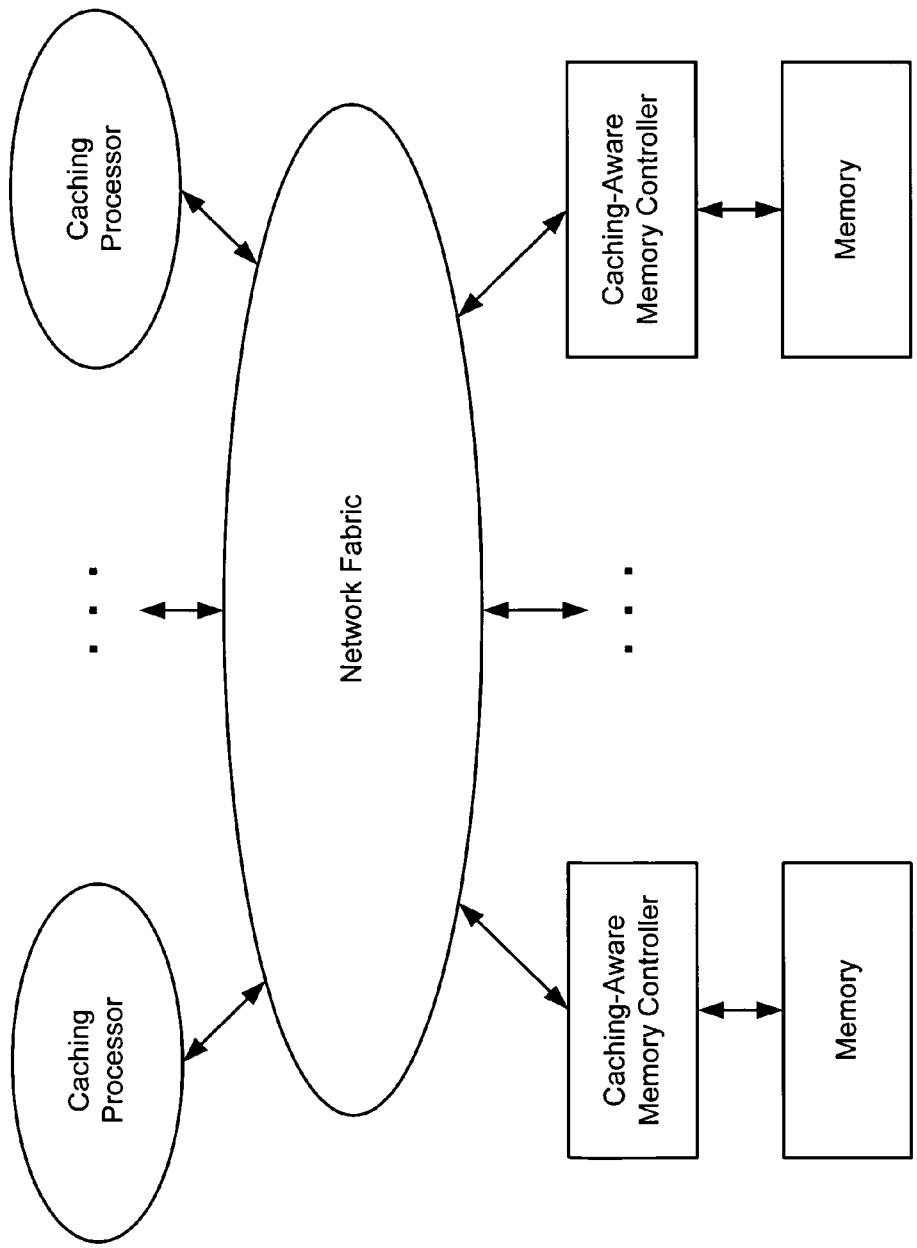
FIG. 2 is a conceptual illustration of one embodiment of a system that may utilize point-to-point interconnects.

FIG. 2 is a conceptual illustration of one embodiment of a system that may utilize point-to-point interconnects. In one embodiment, the system of FIG. 2 may utilize a point-to-point architecture that supports a layered protocol scheme. In one embodiment, the system may include a plurality of caching agents and home agents coupled to a network fabric. For example, the network fabric may adhere to a layered protocol scheme and comprised of: a physical layer, a link layer, a routing layer, a transport layer and a protocol layer (as depicted in connection with FIG. 1). The fabric may facilitate transporting messages from one protocol (home or caching agent) to another protocol for a point-to-point network.

FIG. 2 is a high level, simplified abstraction of a protocol architecture that may utilize one or more point-to-point links. The fabric may facilitate transporting messages from one protocol (caching processor or caching aware memory controller) to another protocol for a point-to-point network. Each caching-aware memory controller may be coupled with memory that may include, for example, dynamic random access memory (DRAM), flash memory, or any other type of memory known in the art.

Figure 3:
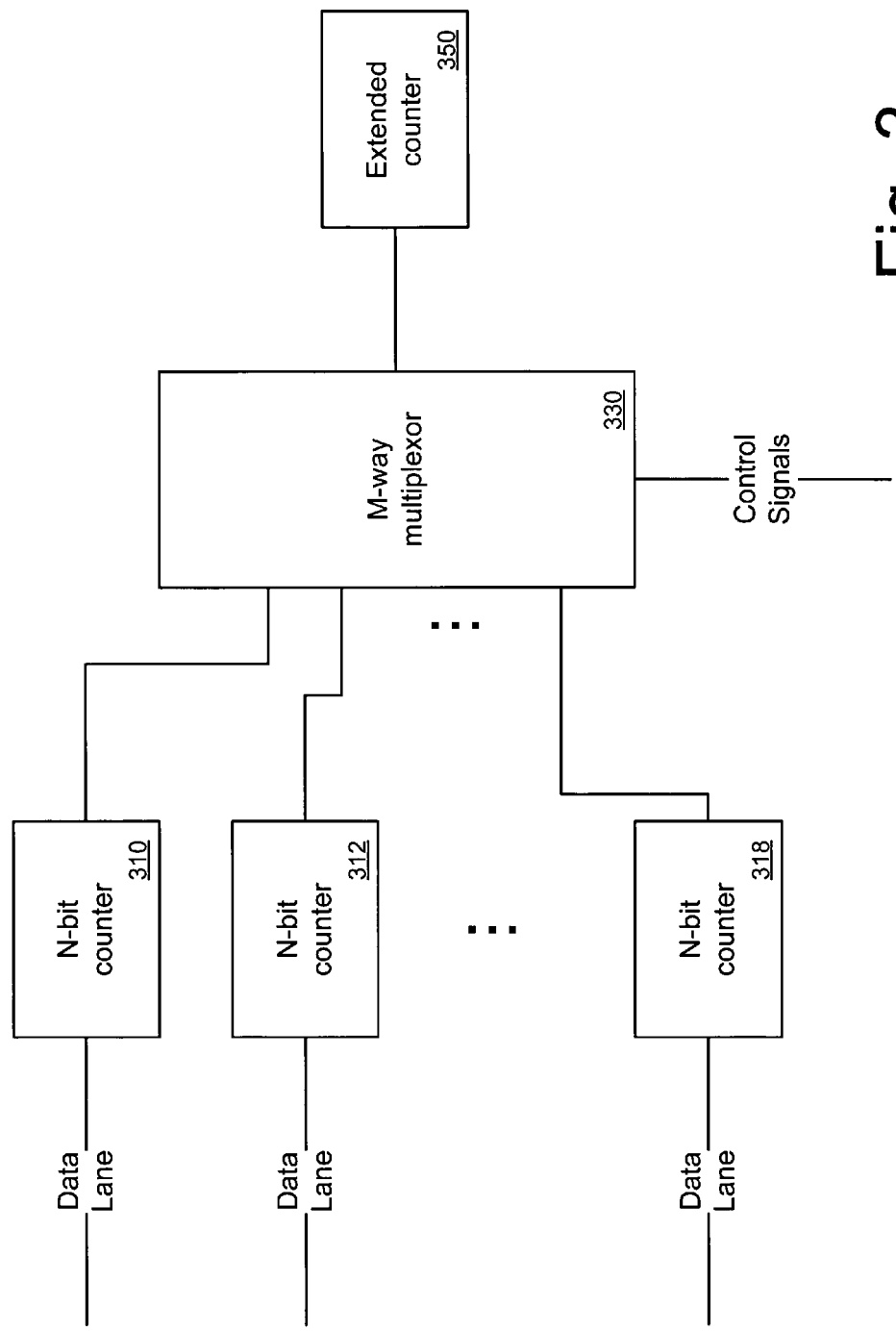
FIG. 3 is a block diagram of one embodiment of a flexible error counting architecture.

FIG. 3 is a block diagram of one embodiment of a flexible error counting architecture. In one embodiment, each data lane corresponds to a serial physical link; however, any data communications medium may be utilized. The configuration of FIG. 3 may be used, for example, to count bit errors that occur during transmission of data over a physical link.

In one embodiment, each data line may be coupled with a N-bit counter (e.g., 310, 312, 318). Any size counter may be used, for example, each counter may be an 8-bit counter. The size of the counter used may be selected based on, for example, the expected error rate for a relatively low end of a frequency, timing and/or voltage stress factors to be used in testing. The N-bit counters may be any size (e.g., 8-bit, 12-bit, 4-bit, 24-bit, 32-bit). Each of the N-bit counters may be coupled with multiplexor 330.

Control signals may be provided to multiplexor 330 by any type of control circuitry. For example, the control signals may be provided by software controlled circuitry that allows a user to determine the configuration of the counters and multiplexor. In another embodiment, the control signals may be provided by firmware to implement a pre-programmed testing sequence.

The output of multiplexor 330 may be coupled with extended counter 350. Extended counter 350 may be any size counter (e.g., 24-bit, 32-bit, 16-bit, 8-bit, 56-bit). For example, if N-bit counters 310, 312, ... 318 are 8-bit counters and extended counter 350 is a 24-bit counter, a selected data lane may have 32 bits of error counting. Thus, a single extended counter may be shared between multiple smaller counters to provide a greater error counting capacity than the N-bit counters alone.

In one embodiment, the error count provided by the combination of the selected N-bit counter and extended counter 350 may be accessible through a debug or testability register. In one embodiment, the following register configuration may be used.

TABLE 1

Register configuration.

| Bits | Width | Name | Default Value | Value/Description |
|---|---|---|---|---|
| 31 | 1 | Error Overflow | 0 | If set, indicates that the error counter has been extended to extended counter. Bit cleared upon Loopback. |
| 30:0 | 31 | Lane Error Counter | 0 | Lane Error Counter is the accumulation of errors in a selected lane. Exact number of bits in counter may vary by architecture implementation. Counter cleared upon Loopback. |

The register configuration of Table 1 corresponds to a total counter (N-bit counter plus extended counter) width of 32 bits. In alternate embodiments, other register configurations may be supported. The register may be accessed in any manner known in the art and the value stored in the register may be used in any manner known in the art.

Figure 4A:
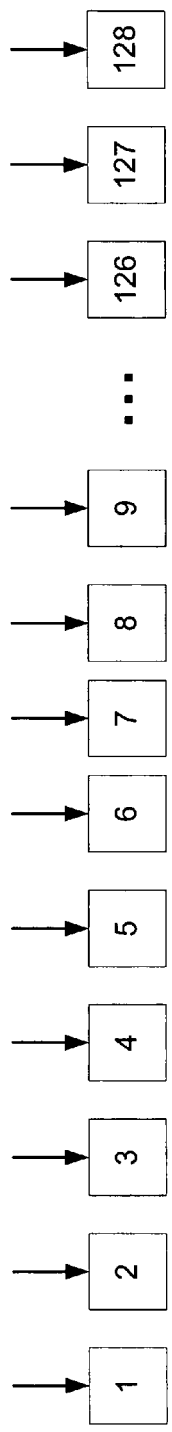
FIG. 4a is a conceptual illustration of error checking using a single register for each bit of an incoming data stream.

In one embodiment, a set of testability registers may be used to support targeted tests and/or on-die oscilloscope functionality. In one embodiment, a register may be utilized to store each bit of an incoming data stream. This is conceptually illustrated in FIG. 4a. While FIGS. 4a, 4b and 5 provide examples of 128 bits, any number of bits my be used.

Figure 4B:
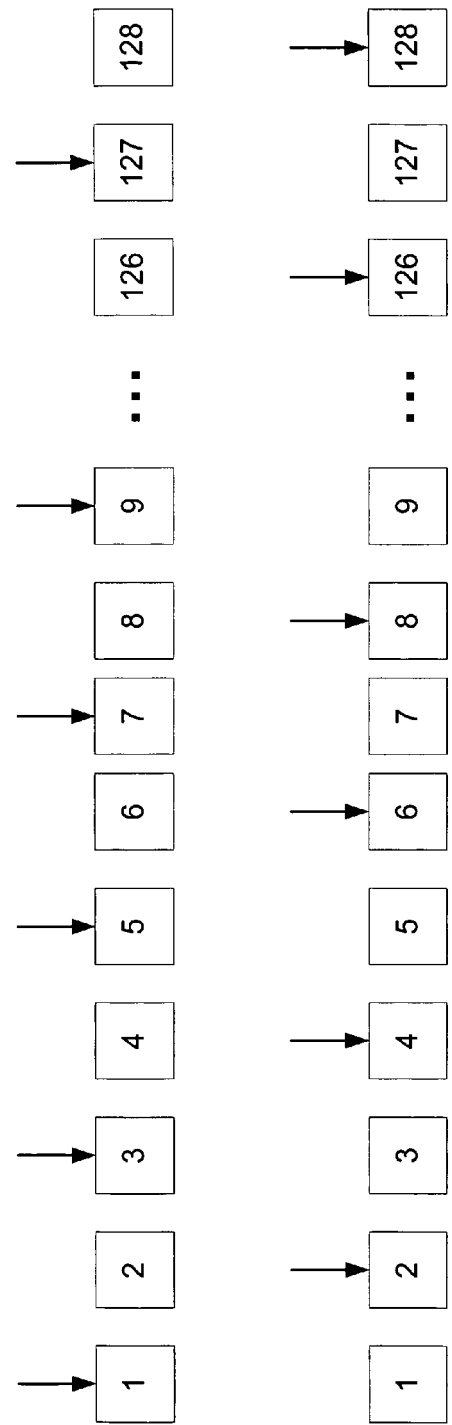
FIG. 4b is a conceptual illustration of error checking using two registers for alternating bits of an incoming data stream to be stored in respective registers.
Figure 5:
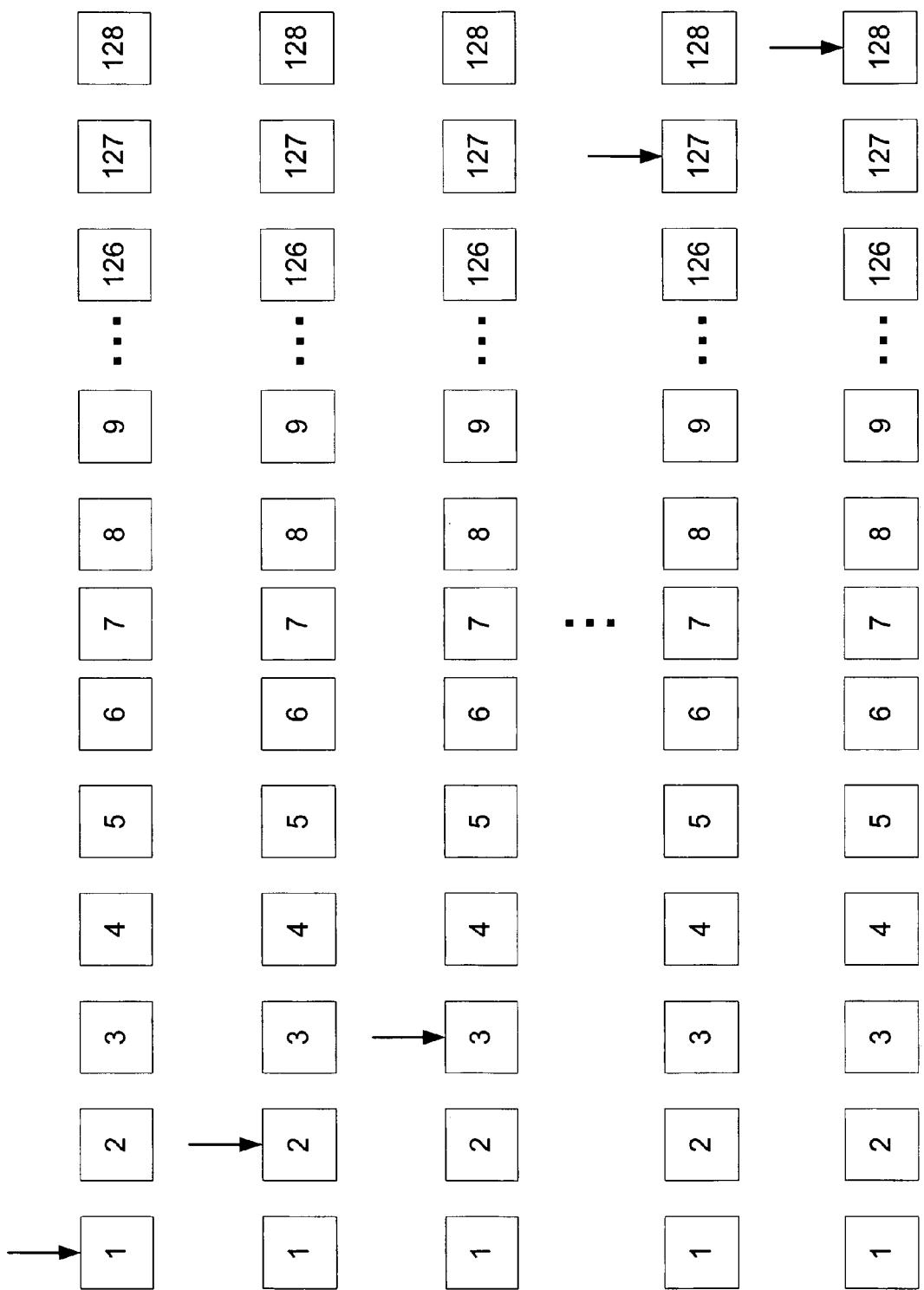
FIG. 5 is a conceptual illustration of error checking using multiple registers for selected bits of an incoming data stream to be stored in respective registers.

FIG. 4b is a conceptual illustration of error checking using two registers for alternating bits of an incoming data stream to be stored in respective registers. In one embodiment, error checking circuitry may have multiple fields that may be used to selectively program sample and store incoming data bits to various testability registers. By interleaving bits one receiver may sample, for example, the odd bits while a second receiver may sample the even bits.

In one embodiment, a testing instruction and/or a testing register may include fields that correspond to a start of testing and an offset, or interval, that may indicate the sampling interval. In the example of FIG. 4b, the first receiver that samples the odd bits may have an offset of "0" and an interval of "2" to indicate that the first bit and every second subsequent bit should be sampled. The second receiver that samples the even bits may have an offset of "1" and an interval of "2" to indicate that the second bit and every second subsequent bit should be sampled. Other offsets and intervals may be used to provide different testing scenarios.

For example, an initial round of testing may be accomplished using a first set of offsets and intervals. This could be, for example, every fourth or every tenth bit. The sampled data may be compared to expected data to determine whether the data appears to be as expected. If so, the test results may be considered satisfactory. If, however, one or more of the bits are not as expected, a different offset and/or interval may be used to provide additional testing information that may be used to debug the underlying system or configuration.

FIG. 5 is a conceptual illustration of error checking using multiple registers for selected bits of an incoming data stream to be stored in respective registers. In one embodiment, each individual bit in a stream of data may be characterized to build an on-die oscilloscope trace. The example of FIG. 5 illustrates a first receiver with offset of "0" and an interval of "128," a second receiver with an offset of "1" and an interval of "128" and so on. In general, the greater the interval the less intersymbol interference (ISI) experienced.

The individual bits that are captured using the offset and interval parameters may be combined to generate an on-die oscilloscope trace using suitable techniques known in the art. The techniques and architectures described herein may provide improved raw data from which to generate testing data. Another advantage of the techniques described herein is that, using the offset and interval parameters, the testing process may be more efficient because the granularity of the testing data may be tailored to the specific situation.

Figure 6:
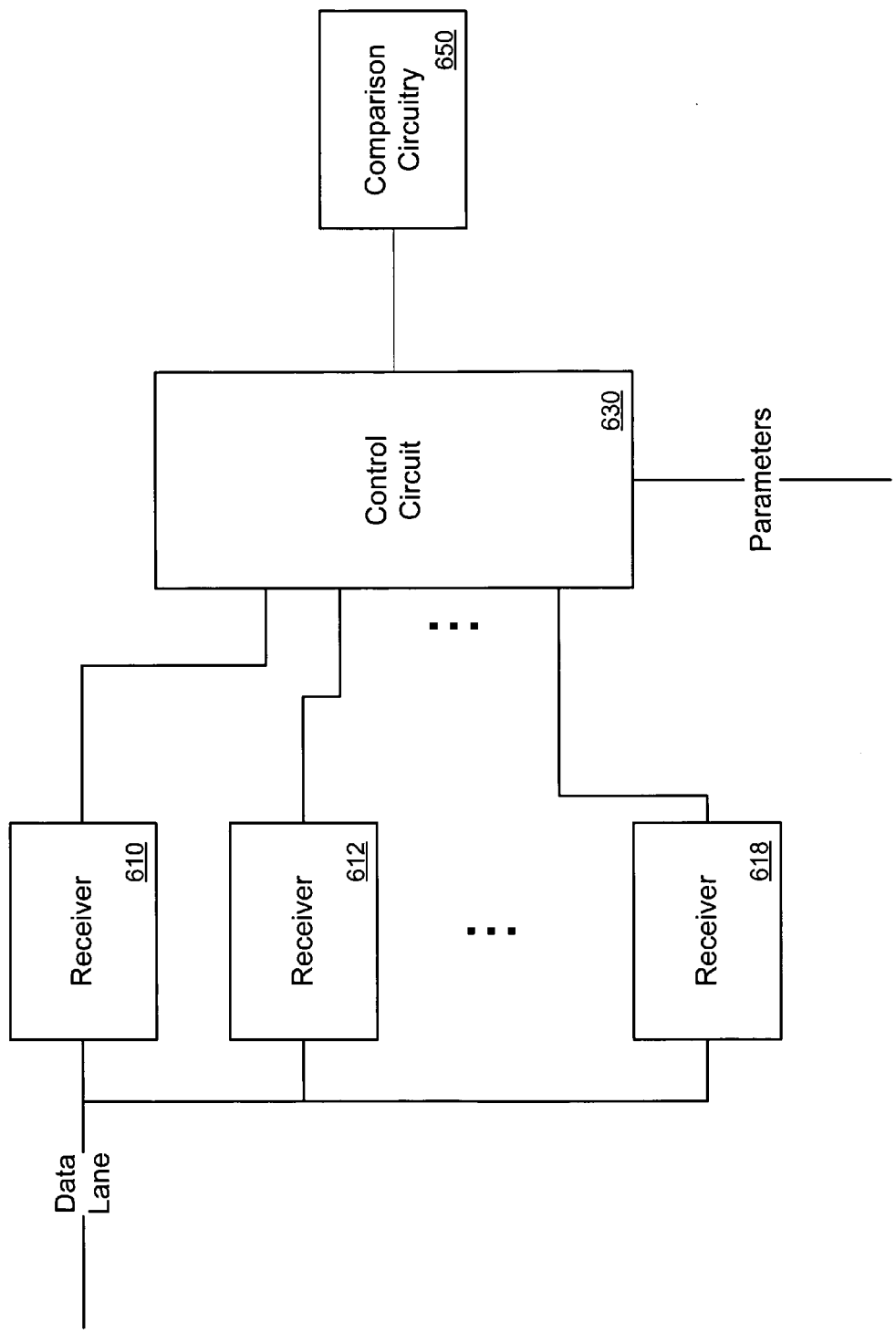
FIG. 6 is a block diagram of one embodiment of circuitry for error checking using selected bits from incoming data streams.

FIG. 6 is a block diagram of one embodiment of circuitry for error checking using selected bits from incoming data streams. Multiple receiver circuits (e.g., 610, 612, 618) may be coupled to receive data via a data lane. The receivers may be coupled with control circuitry 630, which may cause the receivers to selectively sample data according to offset and interval parameters for the respective receivers, as described above. Control circuitry 630 may be coupled to receive the parameters from an external source, for example, one or more debug or testing registers, a software application, etc.

Comparison circuitry 650 may be coupled with control circuitry 630 to compare the sampled data values to expected data values. The sampled data values may be stored, for example, in registers in the respective receivers and/or in registers in control circuitry 630. The sampled data values may be accessed in any manner known in the art.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a plurality of N-bit counters each coupled with a plurality of receivers coupled with corresponding serial data links;
   a multiplexer coupled with the plurality of N-bit counters to select an output signal from one of the plurality of N-bit counters; and
   an expanded counter coupled with the output of the multiplexer to count output signals from the multiplexer.

2. The apparatus of claim 1 wherein the N-bit counters comprise 8-bit counters.

3. The apparatus of claim 1 wherein the N-bit counters are coupled to count errors detected on the respective serial links.

4. The apparatus of claim 1 further comprising a register coupled to store a value based, at least in part, on a selected N-bit counter and the expanded counter.

5. A system comprising:
a plurality of test registers;
a port to communicate via a point-to-point serial link having a receiver and a control circuit coupled with the receiver, the control circuit having a plurality of N-bit counters each coupled with a serial data link, a multiplexer coupled with the plurality of N-bit counters to select an output signal from one of the plurality of N-bit counters, and an expanded counter coupled with the output of the multiplexer to count output signals from the multiplexer, the control circuit coupled with the plurality of test registers.

6. The system of claim 5 wherein the N-bit counters comprise 8-bit counters.

7. The system of claim 5 wherein the N-bit counters are coupled to count errors detected on the respective serial links.

8. The system of claim 5 further comprising a register coupled to store a value based, at least in part, on a selected N-bit counter and the expanded counter.

9. A method comprising:
counting bit errors detected in a plurality of data streams received via a plurality of point-to-point serial links using a plurality of corresponding N-bit counters; and
selectively enabling a multiplexer to pass output signals from the plurality of N-bit counters to an expanded counter to expand counting capacity utilizing the extended counter to enable bit error counting beyond a capacity of the N-bit counters.

10. The method of claim 9 wherein at least one of the N-bit counters comprise 8-bit counters.

* * * * *

UNITED STATES PATENT AND TRADEMARK OFFICE
CERTIFICATE OF CORRECTION

| | | |
|---|---|---|
| PATENT NO. | : 7,617,424 B2 | Page 1 of 1 |
| APPLICATION NO. | : 11/323111 | |
| DATED | : November 10, 2009 | |
| INVENTOR(S) | : Frodsham et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 717 days.

Signed and Sealed this

Nineteenth Day of October, 2010

David J. Kappos
*Director of the United States Patent and Trademark Office*